US012337617B2

(12) United States Patent
Zhu et al.

(10) Patent No.: US 12,337,617 B2
(45) Date of Patent: Jun. 24, 2025

(54) TRUCK TIRE TREAD AND TRUCK TIRE

(71) Applicants: Compagnie Generale des Etablissements Michelin, Clermont-Ferrand (FR); Fang Zhu, Greer, SC (US); Terence Wallace, Simpsonville, SC (US); Stefan Voss, Greer, SC (US); Virgile Ayglon, Greer, SC (US); Clarence Hair, Jr., Greenville, SC (US); Charles McPillan, Simpsonville, SC (US)

(72) Inventors: Fang Zhu, Greer, SC (US); Terence Wallace, Simpsonville, SC (US); Stefan Voss, Greer, SC (US); Virgile Ayglon, Greer, SC (US); Clarence Hair, Jr., Greenville, SC (US); Charles McPillan, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 270 days.

(21) Appl. No.: 16/088,323

(22) PCT Filed: Apr. 7, 2017

(86) PCT No.: PCT/US2017/026593
§ 371 (c)(1),
(2) Date: Sep. 25, 2018

(87) PCT Pub. No.: WO2017/177132
PCT Pub. Date: Oct. 12, 2017

(65) Prior Publication Data
US 2020/0298625 A1 Sep. 24, 2020

Related U.S. Application Data

(63) Continuation of application No. PCT/US2016/026555, filed on Apr. 8, 2016.

(51) Int. Cl.
B60C 11/12 (2006.01)
B60C 11/03 (2006.01)
(Continued)

(52) U.S. Cl.
CPC ...... *B60C 11/0323* (2013.01); *B60C 11/0302* (2013.01); *B60C 11/032* (2013.01);
(Continued)

(58) Field of Classification Search
CPC . B60C 11/1218; B60C 11/04; B60C 11/0323; B60C 11/1281; B60C 11/032;
(Continued)

(56) References Cited

U.S. PATENT DOCUMENTS 2,322,505 A * 6/1943 Bull .................. B60C 11/04
152/DIG. 1
3,556,190 A * 1/1971 Riches ............... B60C 11/0309
152/209.27
(Continued)

FOREIGN PATENT DOCUMENTS

JP 2001-130227 A * 5/2001 ......... B60C 11/1218
WO 2010030276 A1 3/2010
(Continued)

OTHER PUBLICATIONS

Machine translation for Japan 2001-130227 (Year: 2024).*
(Continued)

Primary Examiner — Steven D Maki
(74) Attorney, Agent, or Firm — Neal P. Pierotti

(57) ABSTRACT

The invention provides for a heavy truck tire tread (2) having a longitudinal direction, a lateral direction and a thickness direction, said tread having a ground-engaging contact surface (CS) and having a main longitudinal center groove (5), two main longitudinal shoulder grooves (3, 7) and two main longitudinal intermediate grooves (4, 6), said
(Continued)

five main longitudinal grooves defining six main longitudinal ribs (8, 9, 10, 11, 12, 13), said five main longitudinal grooves comprising one hidden groove, two open grooves and two partially hidden grooves; wherein each of said two partially hidden grooves comprises openings (41, 61) to the ground-engaging contact surface and undersurface channels (42, 62) connecting adjacent openings, longitudinal sipes (43, 63) extending substantially along the longitudinal direction and connecting successive openings to the respective channel; and wherein said hidden groove (5) comprises an undersurface duct (52), a longitudinal sipe (53) extending substantially along the longitudinal direction and connecting said undersurface duct to the ground-engaging contact surface, said hidden groove being the main longitudinal center groove of the tread.

18 Claims, 6 Drawing Sheets

(51) Int. Cl.
  *B60C 11/04* (2006.01)
  *B60C 11/13* (2006.01)
(52) U.S. Cl.
  CPC .......... *B60C 11/04* (2013.01); *B60C 11/1218* (2013.01); *B60C 11/1281* (2013.01); *B60C 2011/0346* (2013.01); *B60C 2011/1361* (2013.01); *B60C 2200/06* (2013.01)
(58) Field of Classification Search
  CPC ......... B60C 11/0302; B60C 2011/0346; B60C 11/124
  See application file for complete search history.

(56) References Cited

U.S. PATENT DOCUMENTS

| | | | | |
|---|---|---|---|---|
| 4,703,787 | A | * | 11/1987 | Ghilardi ................ B60C 11/032 152/DIG. 3 |
| 2011/0168311 | A1 | | 7/2011 | Voss |
| 2011/0277898 | A1 | | 11/2011 | Barraud |
| 2012/0227883 | A1 | * | 9/2012 | Audigier ............. B60C 11/0309 152/209.18 |
| 2013/0014871 | A1 | | 1/2013 | Georges |
| 2013/0284335 | A1 | * | 10/2013 | Rolland ............. B60C 11/0306 152/209.25 |
| 2014/0090761 | A1 | | 4/2014 | Foucher |
| 2014/0224397 | A1 | | 8/2014 | Okabe |
| 2014/0290814 | A1 | | 10/2014 | Audigier |
| 2016/0297252 | A1 | * | 10/2016 | Cambon ............. B60C 11/0332 |
| 2017/0174008 | A1 | * | 6/2017 | Marlier ................. B60C 1/0016 |
| 2018/0170116 | A1 | * | 6/2018 | Daries ..................... B60C 11/13 |
| 2018/0244111 | A1 | * | 8/2018 | Zhu ..................... B60C 11/0306 |
| 2018/0345733 | A1 | * | 12/2018 | Ooba .................. B60C 11/1218 |

FOREIGN PATENT DOCUMENTS

| | | | |
|---|---|---|---|
| WO | WO-2015/082310 | A1 * | 6/2015 |
| WO | WO-2015/114128 | A1 * | 8/2015 |

OTHER PUBLICATIONS

European Patent Office; International Search Report and Written Opinion for patent application PCT/US2016/026555; Dec. 19, 2016; Publisher: European Patent Office, Rijswijk, Netherlands, pp. 1-10, enclosed.

European Patent Office; International Search Report and Written Opinion for patent application PCT/US2017/026593; Jun. 21, 2017; Publisher: European Patent Office, Rijswijk, Netherlands, pp. 1-10, enclosed.

* cited by examiner

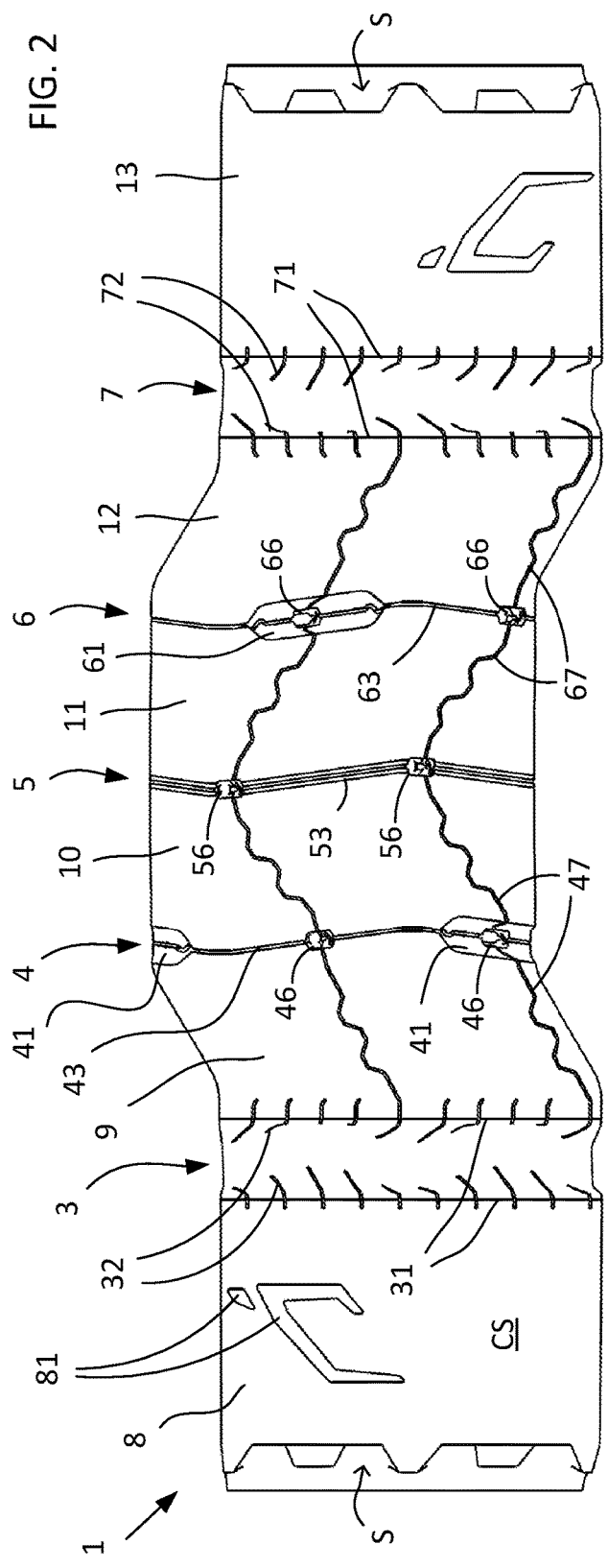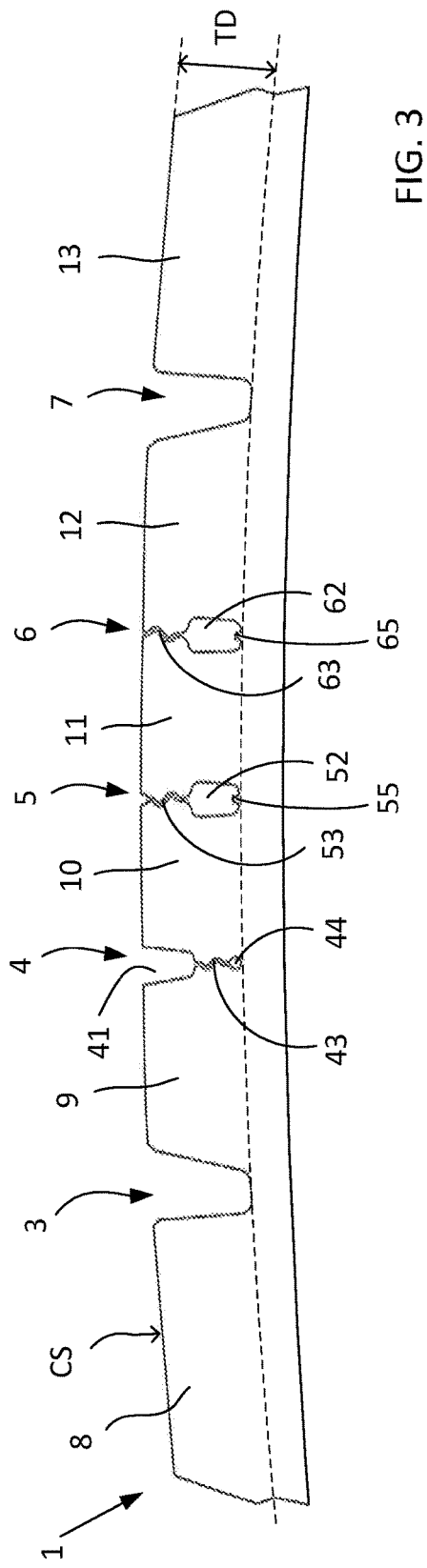

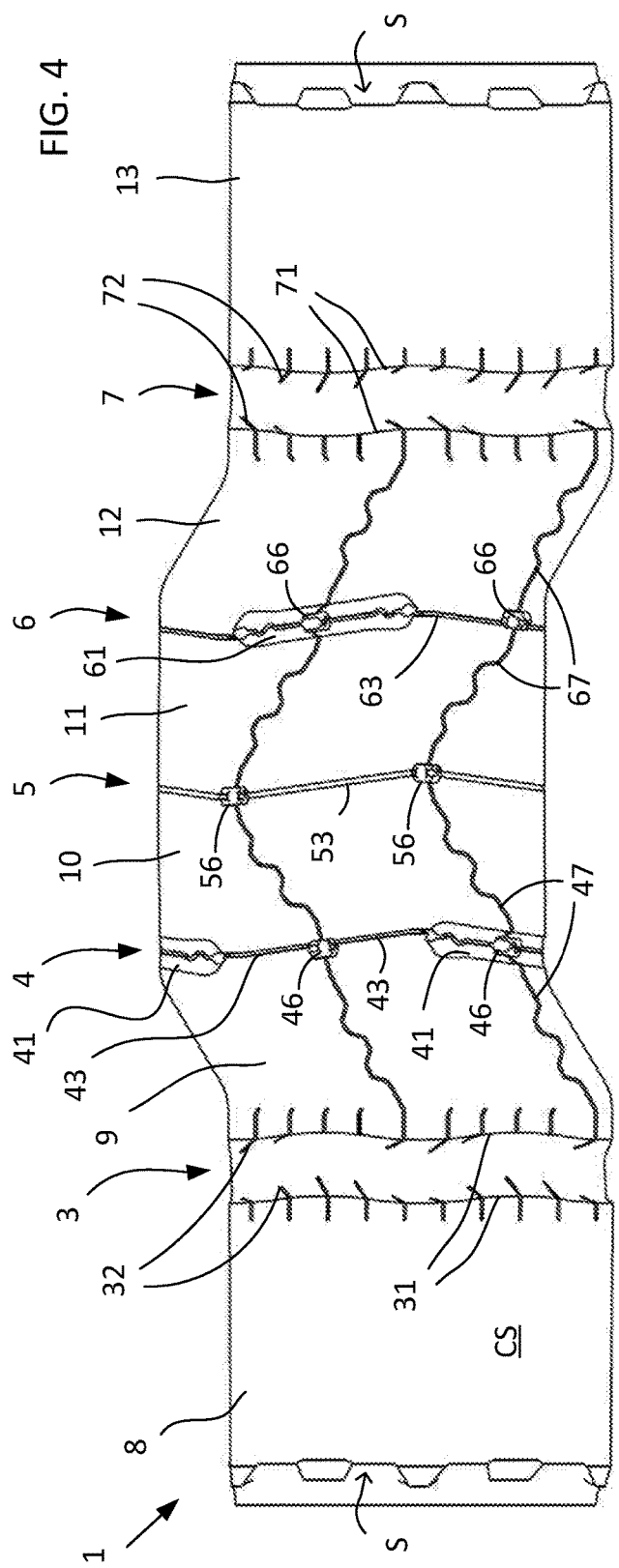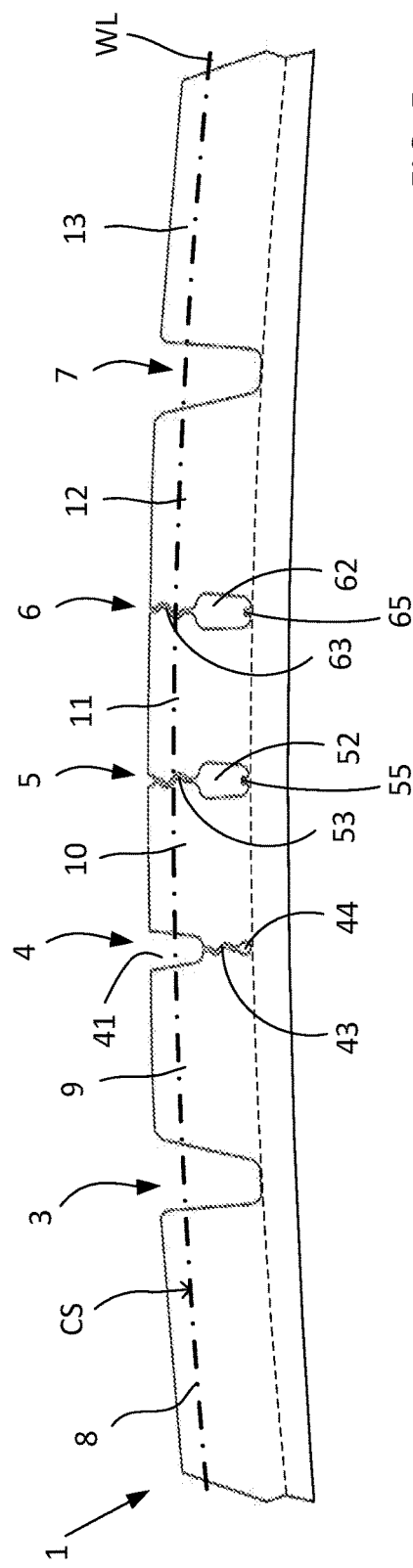

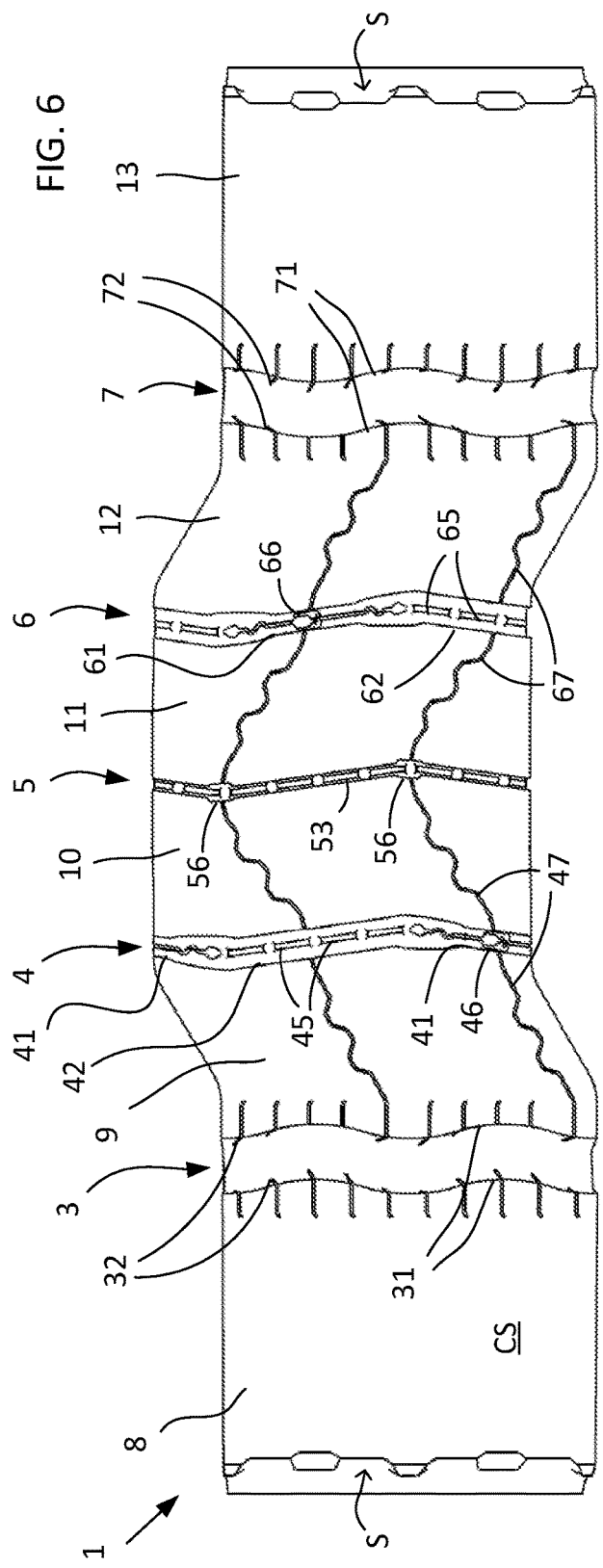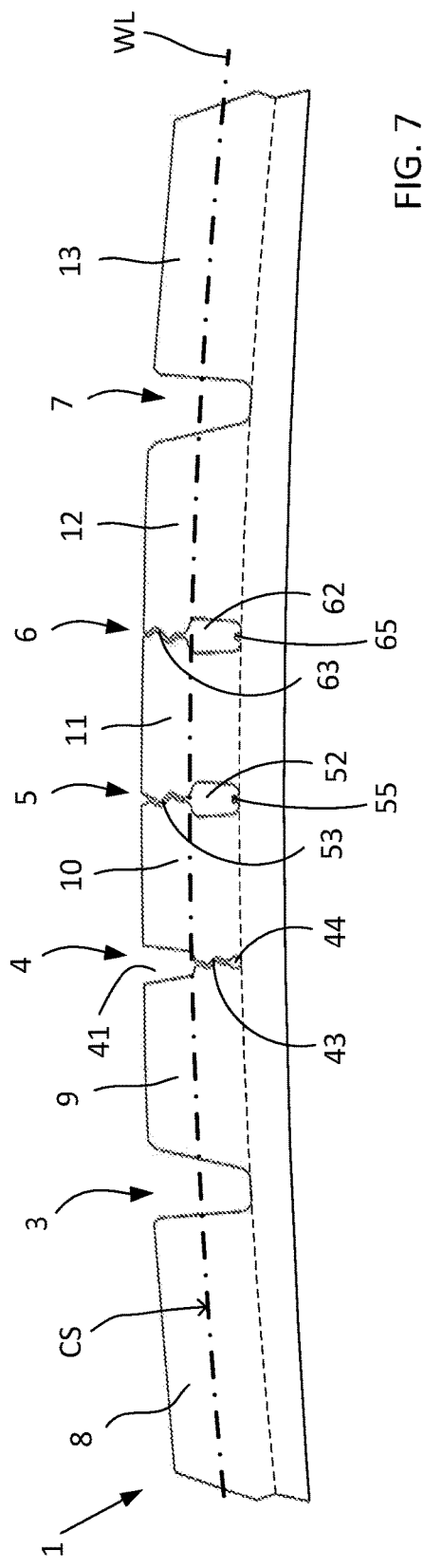

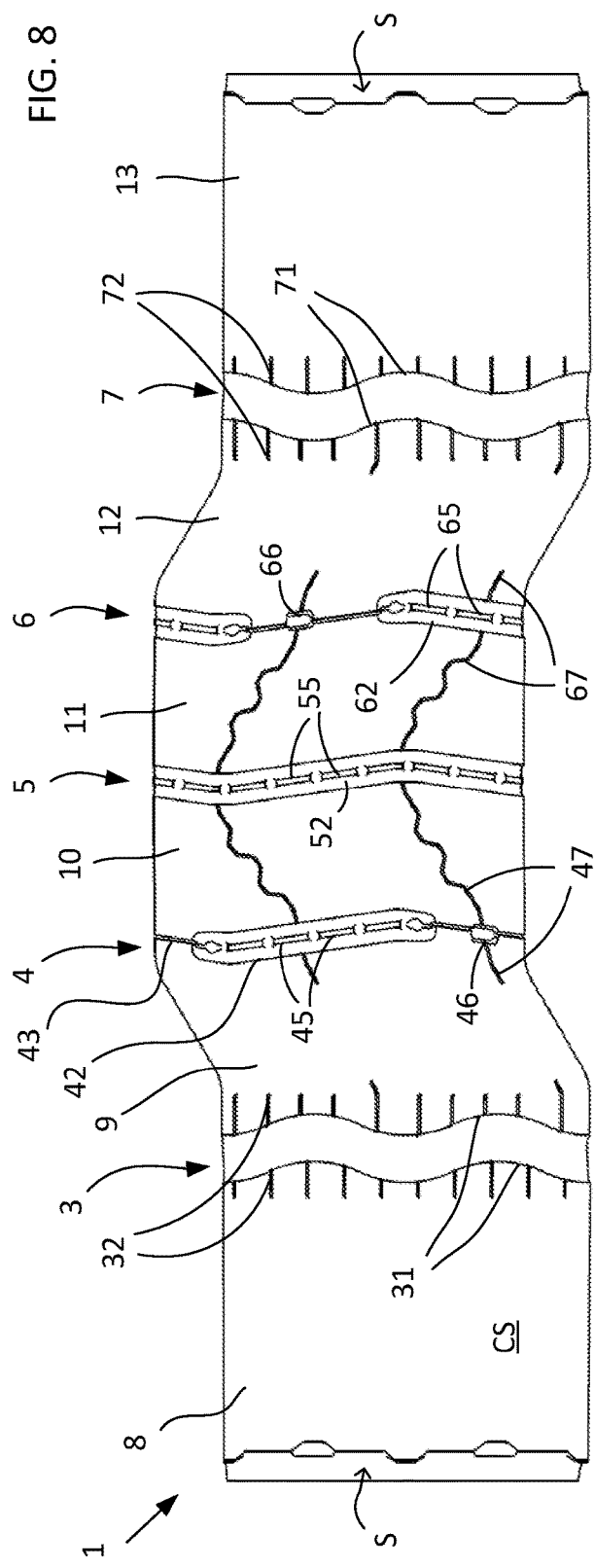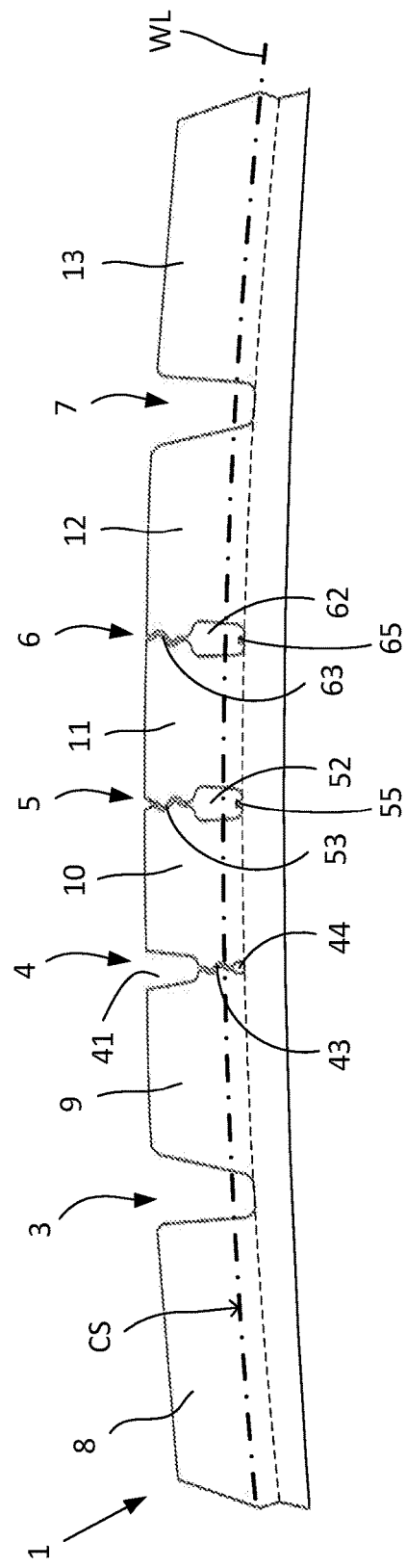

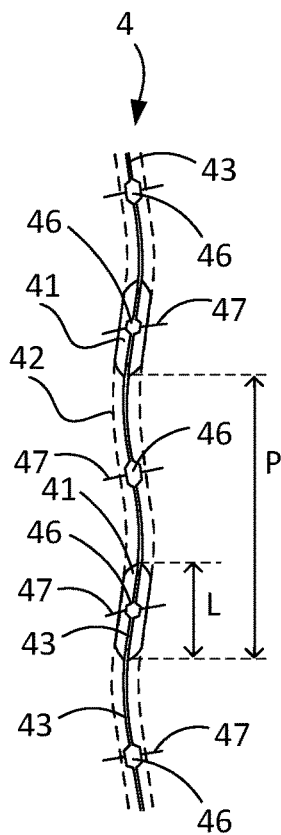
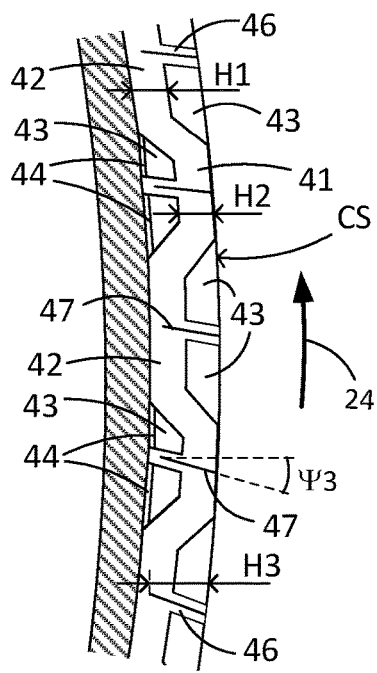
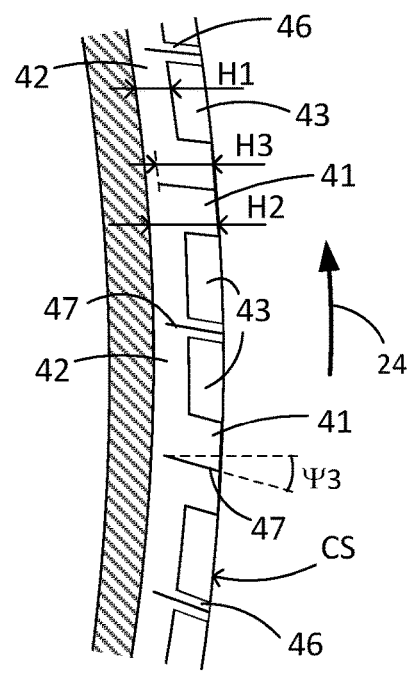
FIG. 10   FIG. 11   FIG. 12
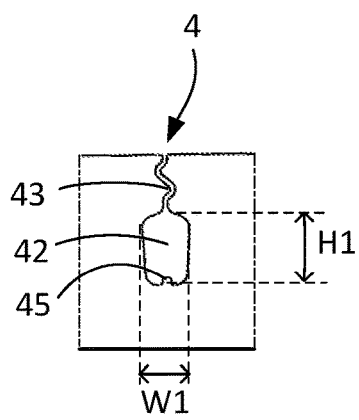
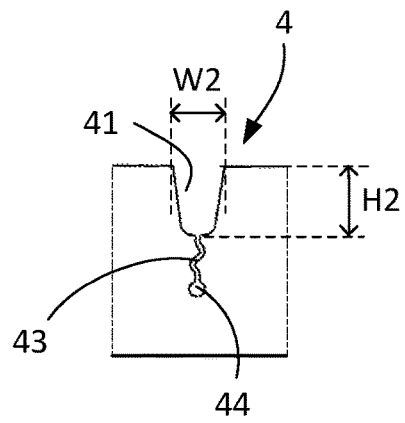
FIG. 13   FIG. 14

TRUCK TIRE TREAD AND TRUCK TIRE

CROSS-REFERENCE TO RELATED APPLICATION

The present application is a national stage entry of International Application Number PCT/US2017/026593 having an international filing date of Apr. 7, 2017 and which claims priority to International Application Number PCT/US2016/026555 which has an international filing date of Apr. 8, 2016. International Application Numbers PCT/US2017/026593 and PCT/US2016/026555 are incorporated by reference herein in their entireties for all purposes.

BACKGROUND OF THE INVENTION

Field of the Invention

This invention relates generally to a tire tread. More specifically, this invention relates to tire treads for heavy trucks, in particular tires for free-rolling wheels thereof (so called steer positions and trailer positions), especially tires for steer positions.

Description of the Related Art

Tire treads generally extend about the outer circumference of a tire to operate as the intermediary between the tire and a surface upon which it travels (the ground surface). Contact between the tire tread and the ground surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions. The tread pattern generally includes repetitions of identical sub-patterns, the length of such sub-pattern being referred to as the "pitch". Each rib or groove (seen in isolation) may have its own pitch and this pitch may be different from the pitch of the full tread including all tread elements and features.

One common problem faced by tire manufacturers is how to increase the wear resistance.

A solution is to increase the ratio of the tread surface being in contact with the operating surface. This ratio is known as the Contact Surface Ratio (CSR). Increasing the CSR is known to be beneficial for wear life. However, increasing the CSR is also known for harming the wet braking adherence performance of the tread. Wet braking adherence performance is a very important element that must not only be obtained with an unworn tread but also throughout the useful life of the tread as it progressively wears out.

Irregular wear is also a great concern as it can provoke vibrations becoming sensible by the driver in the steering wheel or produce a poor looking wear pattern, both of which leading to the tire being often removed from service at an early stage of its wear life.

Therefore, to further increase the wear performance of tires it may be desirous to propose a novel way to design a tire tread that would not result in compromising its wet braking performance or its resistance to irregular wear.

SUMMARY OF THE INVENTION

The invention provides for a heavy truck tire tread having a longitudinal direction, a lateral direction and a thickness direction, said tread having a ground-engaging contact surface and having a main longitudinal center groove, two main longitudinal shoulder grooves and two main longitudinal intermediate grooves, said five main longitudinal grooves defining six main longitudinal ribs, said five main longitudinal grooves comprising one hidden groove, two open grooves and two partially hidden grooves;

wherein each of said two partially hidden grooves comprises openings to the ground-engaging contact surface and undersurface channels connecting adjacent openings, longitudinal sipes extending substantially along the longitudinal direction and connecting successive openings to the respective channel; and wherein said hidden groove comprises an undersurface duct, a longitudinal sipe extending substantially along the longitudinal direction and connecting said undersurface duct to the ground-engaging contact surface, said hidden groove being the main longitudinal center groove of the tread.

In an embodiment of said tread, said two open grooves are the two main longitudinal shoulder grooves of the tread and said two partially hidden grooves are the two main longitudinal intermediate grooves of the tread.

In an embodiment of said tread, the openings of the partially open grooves have a length L along the longitudinal direction being less than 35 mm and preferably less than 20 mm.

In an embodiment of said tread, the openings of the partially open grooves have a length L along the longitudinal direction being not less than 5 mm.

In an embodiment of said tread, a repetition pitch P of the openings in the partially open grooves is between 1.5*L and 3*L.

In an embodiment, said tread has a tread depth TD, wherein a height H1 of the undersurface channel is between 0.25*TD and 0.75*TD.

In an embodiment of said tread, a width W1 of the undersurface channels and undersurface ducts is between 3 mm and 9 mm.

In an embodiment of said tread, a width W2 of the openings in the partially hidden grooves is between 4 mm and 12 mm.

In an embodiment, said tread has a tread depth TD, wherein a height H2 of the openings in the partially hidden grooves is between 0.25*TD and 1.00*TD.

In an embodiment of said tread, the undersurface channels connecting adjacent openings in the partially hidden grooves are undulating in the depth direction, the height H2 of the openings being between 0.45*TD and 0.85*TD.

In an embodiment of said tread, a sum of the height of the undersurface channel and the height of the openings is greater than the tread depth TD.

In an embodiment, said tread comprises lateral sipes connecting the main longitudinal center groove, main longitudinal intermediate grooves and main longitudinal shoulder grooves.

In an embodiment of said tread, said lateral sipes are undulated along the lateral direction of the tread.

In an embodiment, said tread has a tread depth TD, wherein a height H3 of the lateral sipes is greater than 0.5*TD.

In an embodiment of said tread, a bottom surface of the undersurface channels and undersurface duct comprise stone ejectors.

In an embodiment of said tread, the main longitudinal center groove, the two main longitudinal intermediate grooves and said longitudinal sipes undulate along the longitudinal direction of the tread.

In an embodiment of said tread, said longitudinal sipes are undulated along the thickness direction of the tread.

In an embodiment of said tread, the tread pattern is directional.

In an embodiment of said tread, said lateral sipes are inclined relative to the lateral direction.

In an embodiment of said tread, said lateral sipes are inclined relative to the thickness direction.

The invention also provides for a heavy truck tire comprising such a tread.

The foregoing and other objects, features and advantages of the invention will be apparent from the following more detailed descriptions of particular embodiments of the invention.

BRIEF DESCRIPTION OF THE DRAWINGS

FIG. 2 is a top view of part of the tread of FIG. 1 showing details of its design at a much bigger scale.

FIG. 3 is a section view of the tread as seen from the bottom of FIG. 2 showing other details of its design.

FIG. 4 is a top view of the same part of the tread shown in FIG. 2 but with 25% of the original tread depth being worn off.

FIG. 5 is the same section view as the one of FIG. 3 showing the wear level of the tread of FIG. 4.

FIG. 6 is a top view of the same part of the tread shown in FIG. 2 but with 50% of the original tread depth being worn off.

FIG. 7 is the same section view as the one of FIG. 3 showing the wear level of the tread of FIG. 6.

FIG. 8 is a top view of the same part of the tread shown in FIG. 2 but with 75% of the original tread depth being worn off.

FIG. 9 is the same section view as the one of FIG. 3 showing the wear level of the tread of FIG. 8.

FIG. 10 is a top view of an embodiment of a partially hidden groove.

FIG. 11 is a section view of an embodiment of a partially hidden groove.

FIG. 12 is a section view of another embodiment of a partially hidden groove.

FIG. 13 is a magnified section view of an embodiment of a partially hidden groove.

FIG. 14 is another magnified section view of an embodiment of a partially hidden groove.

DETAILED DESCRIPTION OF A PARTICULAR EMBODIMENT

Figure 1:
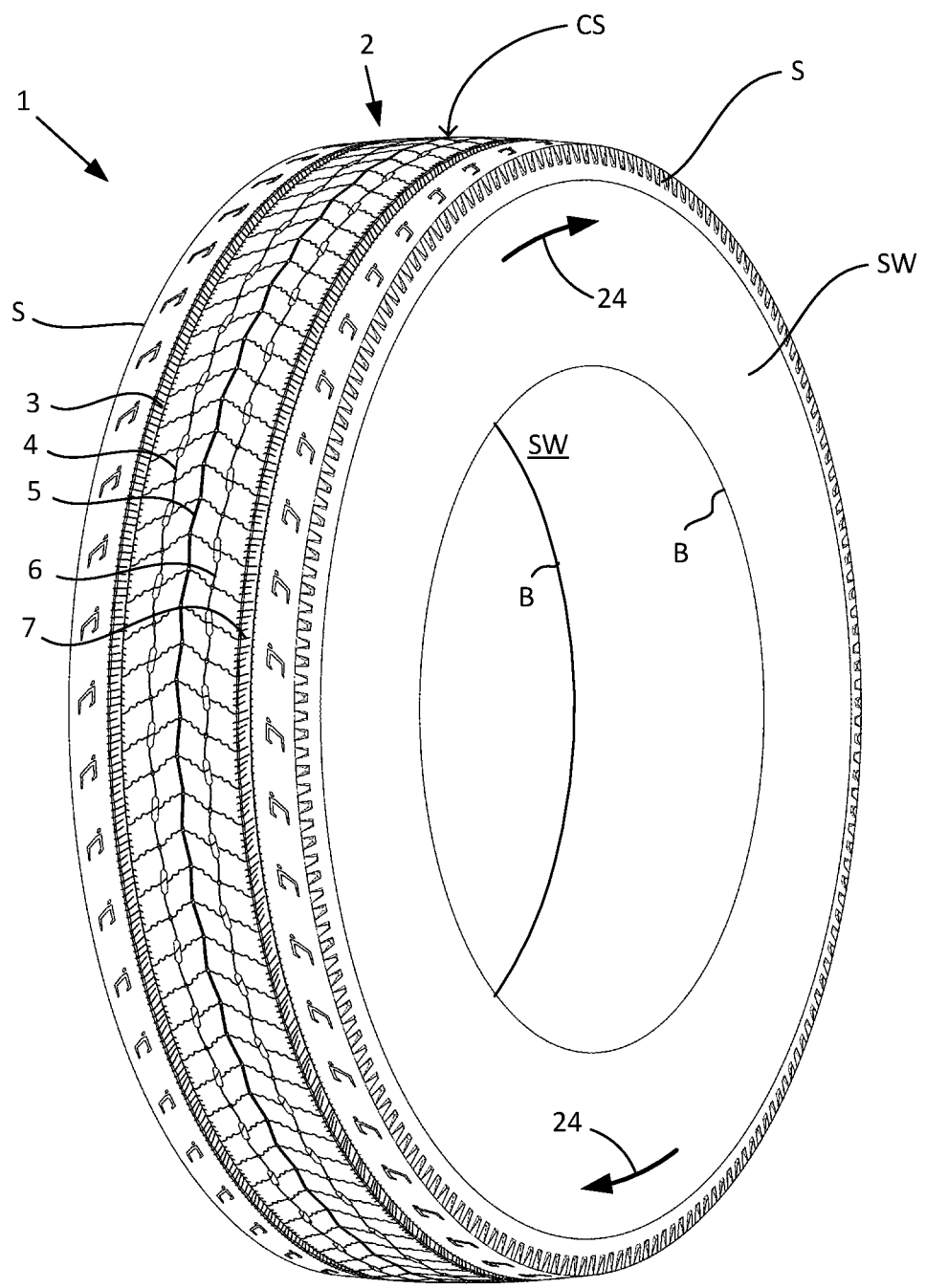
FIG. 1 is a perspective view of a heavy truck tire comprising an embodiment of the disclosed tire tread.

Reference will now be made in detail to embodiments of the invention, example of which are illustrated in the drawings. These examples are provided by way of explanation of the invention.

As shown in FIG. 1, a heavy truck tire 1 comprises a tread 2 according to an embodiment of the invention.

The tread 2 has a contact surface CS for engaging the ground surface on which the tire is rolling and the tire has sidewalls SW connecting the tread to beads B.

The tread has a longitudinal direction (also referred to as the circumferential direction of the tire), a lateral direction (also referred to as the axial or transverse direction of the tire) and a thickness direction (also referred to as the tread depth direction).

This embodiment of the tread being directional, arrows 24 on the sidewall of the tire or shoulder of the tread may indicate the intended rolling direction.

The tread has five main longitudinal grooves (3, 4, 5, 6 and 7 as seen from left to right) going continuously around the circumference of the tire.

The main grooves 3 and 7 closest to the tread shoulders S will now be referred to as the "shoulder grooves". The main groove 5 located in the center of the tread will now be referred to as the "center groove" and the main grooves 4 and 6 which are located between the center groove and the shoulder grooves will now be referred to as the "intermediate grooves".

As shown in more detail in FIG. 2, the five main longitudinal grooves define six main ribs 8, 9, 10, 11, 12 and 13, between tread shoulders S. The main ribs 8 and 13 between shoulders S and shoulder grooves will now be referred to as the "shoulder ribs". The main ribs 9 and 12 between shoulder grooves and intermediate grooves will now be referred to as the "intermediate ribs". The ribs between the two intermediate grooves 4 and 6 on either side of a center groove 5 will now be referred to as the "center ribs" 10 and 11.

As better visible on the combination of FIGS. 2 and 3 which are showing a portion of the disclosed tread 2 in its new state at a much bigger scale, the grooves are varying in shape and size. The portion of the tread shown in FIG. 2 corresponds to one pitch length for this particular tread pattern.

The shoulder grooves 3 and 7 are open grooves. Their edges 31 and 71 at the contact surface are substantially straight along the longitudinal direction.

The intermediate grooves 4 and 6 are partially hidden grooves. A partially hidden groove is a groove which is not fully visible because openings 41, 61 in the contact surface CS alternate with portions where only narrow cuts 43, 63 are connecting an undersurface channel 42, 62 to the contact surface of the tread. Narrow cuts in tread are referred to as "sipes".

The center groove 5 is a hidden groove. A hidden groove is a groove where an undersurface duct 52 is running under the contact surface and will only appear at a later stage in the wear life of the tread. This hidden groove is connected to the contact surface through a longitudinal sipe 53.

Compared to an open groove, a hidden or partially hidden groove allows for a greater contact surface area but is still able to efficiently convey water out of the contact patch when the tire is rolling on a wet ground.

In this embodiment, the shoulder grooves have so-called micro-sipes 32 and 72 on their walls and the shoulder ribs wear shallow features 81. Those shallow features 81 are intended to wear out during the early wear life of the tread.

The tread depth TD is defined as the distance between the contact surface of the new tread and a translation of this contact surface to be tangent to the deepest features in the tread.

It is apparent especially from FIG. 3 that at a point in the wear life of the tread, the tread will have worn to an extent that the channels and ducts emerge at the contact surface and act more like open grooves.

In another embodiment not represented in the drawings, the two shoulder grooves 3 and 7 are partially hidden grooves and the two intermediate grooves 4 and 6 are open grooves.

FIG. 4 shows the same tread as in FIG. 2 when it is down to 75% of its original tread depth after the first quarter of its tread depth has been worn off. This wear level is represented by a dotted line WL on FIG. 5.

Comparing FIG. 4 and FIG. 2, changes include the length of openings 41 and 61 in the partially hidden grooves being increased and the fact that the shallow markings 81 have disappeared from the shoulder ribs.

Similarly to FIG. 4, FIG. 6 shows the same tread as FIG. 2 but when it is down to 50% of its original tread depth after the first half of its tread depth has been worn off. This wear level is represented by a dotted line WL on FIG. 7.

With this level of wear, in the intermediate grooves the undersurface channels 42 and 62 are now open to the contact surface and the openings 41 and 61 have become thinner. The undersurface duct 52 in the center groove is also beginning to appear at the contact surface. The edges 31 and 71 of the shoulder grooves at the contact surface are now showing substantial undulations along the longitudinal direction. Stones ejectors 45 and 65 at the bottom of the intermediate grooves are now well visible.

Similarly to FIG. 6, FIG. 8 shows the same tread as FIG. 2 but when it is down to 25% of its original tread depth after the first three quarter of its tread depth has been worn off. This wear level is represented by a dotted line WL on FIG. 9.

With this level of wear, the undersurface duct 52 in the center groove is now fully open to the contact surface. In the intermediate grooves the openings 41 and 61 have closed, leaving only the longitudinal sipe 43 visible. Stones ejectors 55 at the bottom of the center groove are now well visible.

FIG. 10 shows an embodiment of a partially hidden groove 4 in more detail. This top view corresponds to the tread in new state as in FIGS. 1 and 2. The openings 41 have a length "L" along the longitudinal direction and their repetition has a repetition pitch "P". The pitch P of the openings in the partially open grooves is between 1.5*L and 3.00*L.

FIG. 11 shows the detail of FIG. 10 in section view but in a schematic way in order to clarify the drawing. For instance, the longitudinal sipes 43 and the lateral sipes 47 are represented flat (straight) and not undulated as visible on FIGS. 1-9. Stone ejectors 45 that are visible on the other FIGS. are also omitted here. The section is taken in the center of the groove 4 and is seen from the left of FIG. 10. On this section view, one can better understand the origin of the changes shown in the preceding FIGS as the tread gradually wears out. The openings 41 connect sections of the undersurface channel 42 together. It could also be described as the channel undulating in the thickness direction of the tread with the openings being the locations where the channel 42 is surfacing at the contact surface CS. The height of the channel is labelled "H1" and the height of the openings is labelled "H2".

On this views, one can also visualize the lateral sipes 47 that run across the ribs and connect the grooves. As explained above they appear straight but may undulate in a similar way to what is shown for longitudinal sipes 43 on FIG. 13. The height of the lateral sipes is labelled "H3" and their inclination relative to the thickness direction is labelled "Ψ3". They are designed to be leaning away from the rolling direction 24. In this embodiment, H3 is greater than 0.5*TD and Ψ3 is in the order of 15°. Where the longitudinal sipes 43 and lateral sipes 47 meet (see FIG. 10), a small void 46 may be created in the tread depending on the technology used to obtain and hold the mold blades together. These voids are not acting as an opening 41 in any significant way, their size being much less.

FIG. 12 is similar to FIG. 11 but is showing a different embodiment where the undersurface channel 42 is running at a constant distance from the contact surface and has T-shaped connections to the openings 41. In this embodiment, as the tread wears out beyond a given level, the channel creates a continuous open groove similar to the center groove 5 shown in FIG. 8.

FIG. 13 is a section view of the partially hidden groove 4 showing in particular the size of the undersurface channel 42. Its height is labelled "H1" as discussed earlier and its width is labelled "W1". As visible from FIG. 3, a section of the center groove 5 can be very similar in size and shape to this one. W1 is between 3 mm and 9 mm and H1 is between 0.25*TD and 0.85*TD. The section of the stone ejectors 45 is at least 2×2 mm.

FIG. 14 is a section view of the partially hidden groove 4 showing in particular the size of the opening 41. Its height is labelled "H2" as discussed earlier and its width is labelled "W2". W2 is between 4 mm and 12 mm and H2 is between 0.25*TD and 1.00*TD.

In the embodiment shown in FIGS. 1 to 11, the sum of the height H1 of the undersurface channel 42, 62 and the height H2 of the openings 41, 61 is greater than the tread depth TD (H1+H2>TD).

As known per se in the art and not represented here, the tread may also include sacrificial ribs defined respectively next to the shoulders S by sacrificial grooves. Compared to main ribs, sacrificial ribs are much thinner and their contact surface is offset to a lower radius. Sacrificial ribs have been used for years in heavy truck tires, especially for long haul steer axle application, to combat irregular wear; they are not providing a significant effect on the traction or braking performances of the tire.

It should be understood from the above description that various modifications and changes may be made to the embodiments of the present invention without departing from its true spirit. Only the language of the following claims should limit the scope of this invention.

What is claimed is:

1. A heavy truck tire tread having a longitudinal direction, a lateral direction and a thickness direction, said tread having a ground-engaging contact surface and having a main longitudinal center groove, two main longitudinal shoulder grooves and two main longitudinal intermediate grooves, said five main longitudinal grooves defining six main longitudinal ribs, said five main longitudinal grooves comprising one hidden groove, two open grooves and two partially hidden grooves;

wherein each of said two partially hidden grooves comprises openings to the ground-engaging contact surface and undersurface channels connecting adjacent openings, longitudinal sipes extending substantially along the longitudinal direction and connecting successive openings to the respective channel, wherein portions of the longitudinal sipes terminate at a terminal bottom end of the partially hidden grooves in the thickness direction and are located along the partially hidden grooves so as to be below the openings such that the openings are located between the ground-engaging contact surface and the longitudinal sipes in the thickness direction; and wherein said hidden groove comprises an undersurface duct, a hidden groove longitudinal sipe extending substantially along the longitudinal direction and connecting said undersurface duct to the ground-engaging contact surface, said hidden groove being the main longitudinal center groove of the tread, wherein the hidden groove longitudinal sipe extends to and is located at the ground-engaging contact surface.

2. A heavy truck tire tread according to claim 1 wherein said two open grooves are the two main longitudinal shoulder grooves of the tread and said two partially hidden grooves are the two main longitudinal intermediate grooves of the tread.

3. A heavy truck tire tread according to claim 1 wherein the openings of the partially open grooves have a length L along the longitudinal direction being less than 35 mm.

4. A heavy truck tire tread according to claim 3 wherein the openings of the partially open grooves have a length L along the longitudinal direction being not less than 5 mm.

5. A heavy truck tire tread according to claim 3 wherein a repetition pitch P of the openings in the partially open grooves is between 1.5*L and 3*L.

6. A heavy truck tire tread according to claim 1, having a tread depth TD, wherein a height H1 of the undersurface channel is between 0.25*TD and 0.75*TD.

7. A heavy truck tire tread according to claim 1, wherein a width W1 of the undersurface channels and undersurface duct is between 3 mm and 9 mm, wherein a width W2 of the openings in the partially hidden grooves is between 4 mm and 12 mm.

8. A heavy truck tire tread according to claim 1, wherein the undersurface channels connecting adjacent openings in the partially hidden grooves are undulating in the depth direction, the height H2 of the openings being between 0.45*TD and 0.85*TD.

9. A heavy truck tire tread according to claim 1, having a tread depth TD, wherein a height H1 of the undersurface channel is between 0.25*TD and 0.75*TD, having a tread depth TD, wherein a height H2 of the openings in the partially hidden grooves is between 0.25*TD and 1.00*TD, wherein the undersurface channels connecting adjacent openings in the partially hidden grooves are undulating in the depth direction, the height H2 of the openings being between 0.45*TD and 0.85*TD, wherein a sum of the height of the undersurface channel and the height of the openings is greater than the tread depth TD.

10. A heavy truck tire tread according to claim 1 comprising lateral sipes connecting the main longitudinal center groove, main longitudinal intermediate grooves and main longitudinal shoulder grooves.

11. A heavy truck tire tread according to claim 10 wherein said lateral sipes are undulated along the lateral direction of the tread.

12. A heavy truck tire tread according to claim 10, having a tread depth TD, wherein a height H3 of the lateral sipes is greater than 0.5*TD.

13. A heavy truck tire tread according to claim 10 wherein said lateral sipes are inclined relative to the lateral direction.

14. A heavy truck tire tread according to claim 1 wherein said longitudinal sipes and said hidden groove longitudinal sipe are undulated along the thickness direction of the tread.

15. A heavy truck tire tread according to claim 1 wherein the tread pattern is directional.

16. A heavy truck tire comprising a tread according to claim 1.

17. A heavy truck tire tread having a longitudinal direction, a lateral direction and a thickness direction, said tread having a ground-engaging contact surface and having a main longitudinal center groove, two main longitudinal shoulder grooves and two main longitudinal intermediate grooves, said five main longitudinal grooves defining six main longitudinal ribs, said five main longitudinal grooves comprising one hidden groove, two open grooves and two partially hidden grooves;

wherein each of said two partially hidden grooves comprises openings to the ground-engaging contact surface and undersurface channels connecting adjacent openings, longitudinal sipes extending substantially along the longitudinal direction and connecting successive openings to the respective channel, wherein portions of the longitudinal sipes terminate at a terminal bottom end of the partially hidden grooves in the thickness direction and are located along the partially hidden grooves so as to be below the openings such that the openings are located between the ground-engaging contact surface and the longitudinal sipes in the thickness direction; and wherein said hidden groove comprises an undersurface duct, a hidden groove longitudinal sipe extending substantially along the longitudinal direction and connecting said undersurface duct to the ground-engaging contact surface, said hidden groove being the main longitudinal center groove of the tread;

wherein said tread having a tread depth TD, wherein a height H2 of the openings in the partially hidden grooves is between 0.25*TD and 1.00*TD.

18. A heavy truck tire tread having a longitudinal direction, a lateral direction and a thickness direction, said tread having a ground-engaging contact surface and having a main longitudinal center groove, two main longitudinal shoulder grooves and two main longitudinal intermediate grooves, said five main longitudinal grooves defining six main longitudinal ribs, said five main longitudinal grooves comprising one hidden groove, two open grooves and two partially hidden grooves;

wherein each of said two partially hidden grooves comprises openings to the ground-engaging contact surface and undersurface channels connecting adjacent openings, longitudinal sipes extending substantially along the longitudinal direction and connecting successive openings to the respective channel, wherein portions of the longitudinal sipes terminate at a terminal bottom end of the partially hidden grooves in the thickness direction and are located along the partially hidden grooves so as to be below the openings such that the openings are located between the ground-engaging contact surface and the longitudinal sipes in the thickness direction; and wherein said hidden groove comprises an undersurface duct, a hidden groove longitudinal sipe extending substantially along the longitudinal direction and connecting said undersurface duct to the ground-engaging contact surface, said hidden groove being the main longitudinal center groove of the tread;

wherein the main longitudinal center groove, the two main longitudinal intermediate grooves and said longitudinal sipes and said hidden groove longitudinal sipe undulate along the longitudinal direction of the tread.

* * * * *